(12) United States Patent
Herron et al.

(10) Patent No.: US 6,343,251 B1
(45) Date of Patent: Jan. 29, 2002

(54) METHOD AND SYSTEM FOR MONITORING THE OPERATION OF AND PREDICTING PART LIFE CONSUMPTION FOR TURBOMACHINERY

(75) Inventors: William L. Herron, Greer, SC (US); David R. Germain, Scotia; Louis Andrew Schick, Delmar, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/731,228

(22) Filed: Dec. 7, 2000

Related U.S. Application Data
(60) Provisional application No. 60/241,739, filed on Oct. 20, 2000.

(51) Int. Cl.[7] ............................................... G06F 17/01
(52) U.S. Cl. ........................................ 701/100; 701/29
(58) Field of Search ............................ 701/100, 14, 29, 701/30, 33, 35; 415/13

(56) References Cited

U.S. PATENT DOCUMENTS

| | | | | |
|---|---|---|---|---|
| 5,042,295 A | * | 8/1991 | Seeley | 701/100 |
| 5,680,310 A | * | 10/1997 | Morgan et al. | 701/100 |
| 5,726,891 A | * | 3/1998 | Sisson et al. | 60/39.03 |
| 6,216,066 B1 | * | 4/2001 | Goebel et al. | 701/29 |
| 6,260,350 B1 | * | 7/2001 | Horii et al. | 60/39.3 |
| 6,263,265 B1 | * | 7/2001 | Fera | 701/19 |
| 6,282,882 B1 | * | 9/2001 | Dudd, Jr. et al. | 60/39.141 |

FOREIGN PATENT DOCUMENTS

WO      99 19010 A      4/1999

OTHER PUBLICATIONS

Heavy–Duty Gas Turbine Operating and Maintenance Considerations, GE Power Systems, Robert Hoeft and Eric Gebhardt, Atlanta, GA (GER–3762–G)(9/00).

* cited by examiner

*Primary Examiner*—Richard M. Camby
(74) *Attorney, Agent, or Firm*—Nixon & Vanderhye P.C.

(57) ABSTRACT

A system has been developed for collecting and analyzing data regarding the operation of gas turbines. The system provides reports of the operational hours of a gas turbine. The reports are useful in scheduling maintenance of gas turbines. The system includes a network of sensors monitoring the gas turbine and outputting operational data to a local computer system. A remote database server periodically collects data from several on-site systems for a plurality of gas turbines, and this data is analyzed using criteria that precisely define certain gas turbine operational events in terms that can be automatically applied to operational data collected from the gas turbines.

21 Claims, 13 Drawing Sheets

*Fig. 4*

Turbines: Table — 400, 402

| SerialNur | Customer | Site | Unit | Frame |
|---|---|---|---|---|
| 17872 | ELECTRABEL | CITY OF GHENT | GT1 | 9FA |
| 272001 | CHINA LIGHT AND POWER | BLACK POINT | T4 | 9FA |
| 272002 | CHINA LIGHT AND POWER | BLACK POINT | T3 | 9FA |
| 295187 | STANFORD UNIVERSITY | CARDINAL COGEN | T1 | 6B |
| 295192 | ISRAEL ELECTRIC | RAMAT HOVAV | T1 | 9E |
| 295193 | ISRAEL ELECTRIC | RAMAT HOVAV | T2 | 9E |
| 295350 | VIRGINIA ELECTRIC & POWER CO | CHESTERFIELD POWER STATION | T7 | 7F |
| 295497 | SCOTTISH HYDRO | KEADBY | 1 | 9F |
| | VIRGINIA ELECTRIC & POWER CO | CHESTERFIELD POWER STATION | T8 | 7F |

Record: 1 of 113

TagMasterList : Table — 404

| Index | MasterTag | T17872 | T272001 | T272002 | T295187 | T295192 |
|---|---|---|---|---|---|---|
| 54 | TWS3F01 | TWS3F01 | TWS3F01 | TWS3F01 | TWS3F01 | TWS3F01 |
| 55 | TXM | TXM | TXM | TXM | TXM | TXM |
| 56 | TXSP1 | TXSP1 | TXSP1 | TXSP1 | TXSP1 | TXSP1 |
| 57 | TXSP2 | TXSP2 | TXSP2 | TXSP2 | TXSP2 | TXSP2 |
| 58 | TXSP3 | TXSP3 | TXSP3 | TXSP3 | TXSP3 | TXSP3 |
| 59 | TXSPL | TXSPL | TXSPL | TXSPL | TXSPL | TXSPL |
| 60 | WQJ | WQJ | WQJ | WQJ | WQJ | WQJ |
| 61 | WQJA | WQJA | WQJA | WQJA | WQJA | WQJA |

Record: 1 of 60

Process Steps:

1. Read Data: Read MDRetriever generated .csv data file

2. Derive Data: TNH/TNH_RPM, L84TG/L84TL

3. Data Availability: All parameters available?

4. Data Validity: Simple validity checks (Power out at < 95% Speed)

5. *Hours Based Calculations for Rotor and Hot Gas Path*

6. *Starts Based Calculations for Rotor and Hot Gas Path*

7. Output: Process Log, Error Log, Summary Report

| Serial Number | Start Time | Stop Time | TurningGearHours | PartLoadHours | BaseLoadHours | PeakLoadHours | TotalFiredHours |
|---|---|---|---|---|---|---|---|
| 295885 | 8/19/00 | 8/25/00 23:59 | 168 | 0 | 0 | 0 | 0 |
| 296057 | 8/19/00 | 8/25/00 23:59 | 82.45 | 59.18333333 | 20.63333333 | 0 | 81.56666667 |
| 296058 | 8/19/00 | 8/25/00 23:59 | 70.5 | 70.23333333 | 22.6 | 0 | 94.1 |
| 296066 | 8/19/00 | 8/25/00 23:59 | 0 | 0 | 168 | 0 | 168 |
| 296278 | 8/19/00 | 8/25/00 23:59 | 0.15 | 1.333333333 | 159.3166667 | 0 | 160.95 |
| 296279 | 8/19/00 | 8/25/00 23:59 | 0 | 0 | 168 | 0 | 168 |
| 296302 | 8/19/00 | 8/25/00 23:59 | 0 | 0 | 168 | 0 | 168 |
| 296303 | 8/19/00 | 8/25/00 23:59 | 0 | 0.166666667 | 167.8333333 | 0 | 168 |
| 296436 | 8/19/00 | 8/25/00 23:59 | 0 | 0 | 0 | 168 | 168 |

| FactoredHoursRotor | FactoredHoursHotGasPath | Starts | Stops | Trips | GER3620FactoredStartsHotGasPath | GER3620FactoredStartsRotor | GER3620FactoredStartsHotGasPath |
|---|---|---|---|---|---|---|---|
| 336 | 0 | 0 | 0 | 0 | 0 | 0 | 0 |
| 185.5333333 | 20.63333333 | 7 | 8 | 0 | 0 | 6.8 | 4 |
| 163.6 | 22.6 | 6 | 7 | 0 | 0 | 5.9 | 3.75 |
| 168 | 168 | 0 | 0 | 0 | 0 | 0 | 0 |
| 159.6166667 | 159.3166667 | 1 | 2 | 0 | 0.9 | 0 | 1.5 |
| 168 | 168 | 0 | 0 | 0 | 0 | 0 | 0 |
| 168 | 168 | 0 | 0 | 0 | 0 | 0 | 0 |
| 167.8333333 | 167.8333333 | 0 | 1 | 0 | 0 | 0 | 0 |
| 336 | 1008 | 0 | 0 | 0 | 0 | 0 | 0 |
| 327.55 | 965.75 | | | | | | |

METHOD AND SYSTEM FOR MONITORING THE OPERATION OF AND PREDICTING PART LIFE CONSUMPTION FOR TURBOMACHINERY

RELATED APPLICATION

Priority is claimed to U.S. Provisional Application Serial No. 60/241,739, filed Oct. 20, 2000, the entirety of which is incorporated by reference herein.

TECHNICAL FIELD

The present invention relates to the field of the operation and maintenance of industrial turbomachinery. In particular, the invention relates to monitoring and tracking the operation of turbomachinery, predicting the operational life of the turbomachinery and its parts, and scheduling maintenance for the turbomachinery.

BACKGROUND

Gas turbines generally include a compressor and turbine arranged on a rotating shaft(s), and a combustion section between the compressor and turbine. The combustion section burns a mixture of compressed air and liquid and/or gaseous fuel to generate a high energy combustion gas stream that drives the rotating turbine. The turbine rotationally drives the compressor and provides output power. Industrial gas turbines are often used to provide output power to drive an electrical generator or motor. Other types of gas turbines may be used as aircraft engines, on-site and supplemental power generators, and for other applications.

Gas turbines have many parts and components that are exposed to corrosive combustion gases, extreme temperatures, centrifugal stresses and other adverse conditions. These conditions impose stresses and corrosive elements on the gas turbine that cause wear, strain, fatigue, corrosion and other harmful effects. Moreover, the major rotating components, e.g., shaft, turbine and compressor, sustain stresses and are critical to the operation of the gas turbine.

In addition, the compressor, combustion section and turbine form a gas-path for the air and combustion gases that flow through the gas turbine. These gas-path components withstand extremely high energy loads, temperatures and corrosive gases. The elevated temperatures, high stresses and aggressive environmental conditions create time-dependent and cyclic failure mechanisms that act on the gas turbine, and especially the gas path components of the gas turbine. These conditions can lead to failure of components of the gas turbine and, possibly, failure of the gas turbine itself.

The gas turbine components that generally require much attention to maintenance are those associated with the combustion process, e.g., combustion chambers (cans), combustion liners, end caps, crossfire tubes, turbine nozzles, turbine buckets, etc. These "hot-gas-path" components tend to be those that require regular replacement, and are the subject of regular preventive maintenance and replacement programs. In addition, other basic gas turbine components, such as control devices, fuel metering equipment, gas turbine auxiliaries, load packages, and other station auxiliaries require periodic servicing.

Preventive maintenance safeguards industrial gas turbines from failure and undue wear of components. Preventative maintenance requires a maintenance schedule to be established for each gas turbine. The schedule is created based on the operating history of the gas turbine. The technicians who operate the gas turbines maintain detailed and comprehensive logs of their operation, including the start-stop times, operating conditions, fuel, load and other conditions. Using these logs, the technicians and supervising engineers monitor the operation of the gas turbine and schedule preventive maintenance and parts replacements.

In recent years, control systems for gas turbines have been developed that collect data from sensors on the turbine. This data reflects the operating condition of the gas turbine, in a manner similar to the data manually logged by earlier technicians. Accordingly, some of the manual logging of operating conditions have been replaced by automatic data collecting control systems.

Manufacturers of gas turbines generally provide instructional manuals as to how to monitor the gas turbine and schedule maintenance and repairs. For example, the Power System Division of the General Electric Company provides a manual entitled "Heavy-Duty Gas Turbine Operating and Maintenance Considerations" (GER-3620G) that explains how to create maintenance schedules for gas turbines and how to conduct preventive maintenance. By following the instructions described in the manual, a technician evaluates the logged operating history of a gas turbine and determines when and what preventive maintenance should be performed.

Prior techniques for scheduling maintenance for industrial gas turbines relied on algorithms that predicted the expected operating life of various components of the turbine. These algorithms for predicting component life are typically based on a defined "design duty cycle", which is a standardized operational cycle for the gas turbine or one of its components. The design duty cycle is used to predict the deterioration of parts in a gas turbine during a standard cycle of starting, a power production (which may be constant or variable) period and shut-down. The design duty cycle simulates the actual deterioration of parts in a gas turbine operating under conditions for the turbine was designed. However, the design duty cycle does not truly reflect the actual operating conditions of a gas turbine, actual operating conditions are often substantially different than those for which the gas turbine was designed.

The actual maintenance requirements of a gas turbine depend on its actual operational history, which includes the actual operating conditions. The actual life of a gas turbine is a strong function of actual usage of that turbine. Off-design operating conditions and off-design modes (e.g., operating conditions substantially different than duty cycle conditions) affect metal temperatures and stresses, and result in more (or less) than predicted damage to the gas turbine. To reflect off-design conditions, prior techniques have used "maintenance factors" to supplement the duty cycle analysis. "Maintenance factors" quantify the severity of off-design operation. Maintenance factors have been manually determined by gas turbine technicians and engineers.

Conventional methods of predicting part failure for gas turbines and scheduling maintenance have not been entirely accurate in predicting part failures or optimally scheduling maintenance. The traditional "duty cycle" used for predictive maintenance does not reflect real operational conditions, especially off-design operations. The actual life of a component of a gas turbine depends strongly on the actual usage of that gas turbine and the part within the turbine. For example, elevated temperatures and stresses within the turbine, and aggressive environmental conditions may cause excessive wear on components in the turbine beyond that predicted with the standard design duty cycle. Off-design operating conditions, which are often experienced by industrial gas turbines, are not reflected by the standard duty cycles. The actual part life of components in the gas turbine may be substantially less than that predicted by the design duty cycle. Alternatively, if more favorable conditions are experienced by an actual gas turbine (than are reflected in the design duty cycle), the actual part life may last substantially longer than that predicted by maintenance schedules based on the design duty cycle. In either event, the standard "design duty cycle" model for predicting preventive maintenance in industrial gas turbines does not reliably indicate the actual wear and tear experience by a gas turbine. Accordingly, there is a long-felt need for a technique to more accurately predict the life of a gas turbine and its components.

Prior techniques for predicting maintenance and part replacement relied on skilled technicians to acquire or interpret data regarding the operation of a gas turbine. Such techniques were subject to the varying interpretations of that data by technicians. The operational logs and/or data collected from gas turbines were manually evaluated by technicians. Technicians, for example, would evaluate start and stop times, and power settings to determine how many duty cycles had been experienced by the gas turbine, their frequency, period and other factors. In addition, if the log data of the gas turbine indicated that extraordinary conditions existed, such as excessive temperatures or stresses, the technicians would apply "maintenance factors" to quantify the severity of these off-design operational conditions.

SUMMARY OF INVENTION

A system has been developed to automatically capture and analyze operational data from industrial gas turbines. The data is analyzed by the system to determine expected component wear and deterioration in the gas turbine. Based on the analysis, reports are generated by the system that may be used to schedule maintenance for the gas turbine.

Algorithms have been developed to analyze the operational data from each gas turbine. These algorithms may calculate the operational exposure of a gas turbine in terms of "factored hour", "factored starts", and conventional standards previously used for evaluating maintenance periods in gas turbines. In addition, precise definitions have been developed for various gas turbine events and conditions, such as start and stop conditions. These definitions facilitate the automatic analysis by computers of data collected from the gas turbine. The definitions are applied by computers to identify the occurrence of specific events, e.g., starts, stops and load, and operating modes of a gas turbine based on operational data acquired from the gas turbine. These events and modes are evaluated by the computer using algorithms to generate information regarding the operational events and modes of the gas turbine that are useful in scheduling maintenance of the gas turbine.

The system may be used to provide inspection and repair scheduling services for operators of industrial gas turbines. For example, data collected remotely from operational gas turbines may be evaluated and used to generate automatic maintenance scheduling reports. These reports schedule outages, i.e., periods during which the gas turbine is to be shut down for maintenance. In addition, the reports may list parts to be ordered and on hand during the scheduled outages for replacement in the gas turbine.

These reports of a maintenance schedule and components to be replaced are provided by the system to maintenance technicians. The reports may be in the form of charts that show the times of various modes of gas turbine operation. Based on these charts, a technician can readily schedule appropriate maintenance for a gas turbine.

The technicians avoid having to undergo the laborious task of reviewing operational logs of the turbine and determine the operational times of the various modes of the gas turbine. In addition, the system generates information based on actual operational data from the individual gas turbines. Thus, reports generated by the system are optimized for scheduling maintenance.

The system has been designed such that its algorithms, definitions and data collection techniques can be readily modified as needed. For example, if it is determined that certain maintenance is being scheduled too infrequently, the algorithm for that particular type of maintenance may be adjusted so as to schedule maintenance more frequently.

BRIEF DESCRIPTION OF THE DRAWINGS

FIG. 4 shows an exemplary computer screen window of data that is to be collected from multiple gas turbines for analysis.

FIG. 7 is a flowchart showing process steps for evaluating data.

FIGS. 8 through 12 are screen images of computer program displays showing graphically operational characteristics of individual gas turbines.

FIG. 13 is a database screen showing summaries of operational information of multiple gas turbines.

DETAILED DESCRIPTION OF THE DRAWINGS

Figure 1:
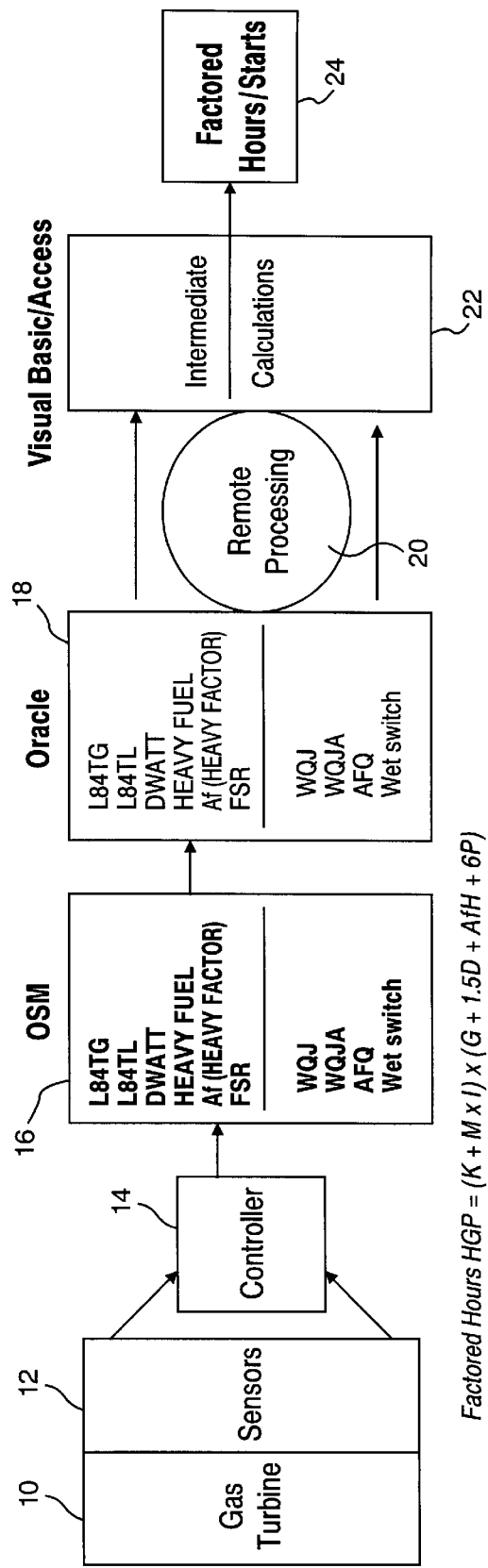
FIG. 1 is a block diagram showing a gas turbine system with controller, coupled to monitoring computer system that collects operational data of the gas turbine and transfers that data to other computer systems for further processing.

FIG. 1 shows as block diagram a computer network system for capturing operational data from a gas turbine, transferring that data to a central database, processing the data and further analyzing the data to generate reports regarding maintenance intervals and replacement parts. The system collects electronic data on the operating condition and history of a gas turbine. This information is automatically categorized, processed and analyzed. Maintenance schedules and part replacement lists are generalized and sent to the technicians for the gas turbines.

A gas turbine 10 includes a compressor, combustion section, turbine, fuel system and other major systems. The gas turbines are each outfitted with a wide array of sensors 12 for measuring gas flow pressures, combustion gas temperatures, rotational speed, stresses and strain, vibration, fuel flow, power output, and other operating conditions of the turbine. These sensors 12 may provide signal outputs to a controller 14 which is directly mounted on and controls the operation of the gas turbine. An exemplary controller is the General Electric "Mark X" industrial gas turbine controller.

The sensor signal data may be processed by the controller 14 and outputted as operational data to an on-site monitor (OSM) 16. The OSM may be a local computer system on site at the facility with the gas turbine. The OSM may monitor several gas turbines at a particular facility. The OSM may monitor data in both real time and maintain historical data regarding past operational activities of the gas turbine. The OSM stores data collected from each gas turbine in one or more databases.

A remote database 18 may be maintained on a database server, such as running an Oracle™ database software application. The Oracle™ database 18 maintains information regarding many gas turbines which may be distributed over several different locations and monitored by various different OSMs 16. This remote databases sever 18 downloads gas turbine sensor information from the OSM 16, which are on site with various gas turbines. The Oracle™ database server 18 remotely collects the turbine sensor information from each OSM 16. The Oracle™ database server 18 may periodically poll each OSM 16, e.g., weekly, to collect current gas turbine sensor information. The Oracle™ database server has database(s) arranged to collect and organize data from each individual gas turbine. The database on the Oracle™ server provides a source of current operating information from many different gas turbines that are monitored by the server.

There are several major factors that influence the maintenance and part life in industrial gas turbines. For example, the starting cycle, power setting, type of fuel, level of steam or water injection are key factors in determining when maintenance should be scheduled and the interval between scheduled maintenance periods.

The operational data regarding gas turbines maintained at the remote database server 18, e.g., sensor output information from the various gas turbines, is processed 20 to generate information regarding the operational conditions of each gas turbine. For example, the processing may determine the base load operating hours on gas fuel (G) that each gas turbine undergoes. Similarly, the processing may determine base load operating hours on distillate fuel (D), and the operating hours on heavy fuel (H) for each gas turbine. Other processing steps may determine peak load operating hours (P), and the percent water/steam injection reference to inlet airflow for each operating hour of each gas turbine. Another analysis performed by the remote processing 20 may be to determine the water and injection constants (M & K) for each gas turbine.

The VisualBasic/Access database server 22 provides a retriever to collect information on gas turbines from the database server 18, an intermediate data storage for further calculations, and processing for data to generate information useful to monitor the operation of gas turbines and schedule maintenance. Data is retrieved by the access server 22 from the Oracle™ database 18, and from remote processing steps 20. This retrieved data is processed by software applications on server 22 to perform additional calculations to generate information regarding the operational status of the gas turbine.

For example, the VisualBasic/Access server may generate a "factored hours HGP" criteria which is expressed by the equation:

$$\text{Factored Hours } HGP = (K + M \times I) \times (G + 1.5D + AfH + 6P)$$

In addition, the server 22 may generate information regarding the actual operating hours which is the sum (G+D+H+P) of the operating hours on various fuels by the gas turbine.

A "Factored Starts" may be mathematically defined as follows:

$$\text{Factored Starts} = (0.5)NA + NB + (1.3)NP + (20)E + (20)F$$

where NA is the number of part load starts; NB is the number of normal based load starts; NP is the number of Peak Load Starts; E is the number of Emergency Starts, and F is the number of Fast Load Starts.

The total number of starts may be defined as:

$$\text{Actual starts} = NA + NB + NP + E + F + T$$

where T is the number of trips.

The VisualBasic/Access server 22 performs at least two major functions. The first function is to "retrieve data" (retriever function) regarding the operation of various gas turbines from the Oracle™ remote database 18. The second function is to process the retrieved data using precise parameter definitions to determine gas turbine operating conditions. The retrieval of data collection may be performed periodically, such as weekly, so that the data in the VisualBasic/Access server is always current. To collect information from the remote database 18, a software application, e.g., a "retriever", operates on the VisualBasic/Access server 22. The "retriever" is a software agent that retrieves data from other databases, such as the remote database server 18. This transfer may be in a relatively common and data-friendly format, such as a "wide format", e.g., *.csv data file format.

In addition to transferring data, the retriever may schedule other software applications on server 22 which analyze the data obtained by the retriever. For example, the retriever may schedule a software application that calculates factored hours of operation for each gas turbine for which data has been collected by the retriever.

The software applications scheduled by the retriever may also run on the VisualBasic/Access database server 22. These applications process data for each turbine that has been collected by the retriever and stored on server 22. The application obtains instructions and data from the Access database on the server 22. The access database is arranged and configured so that data is stored in formats that are easily used by the applications scheduled by the retriever.

An example of the applications that are scheduled by the retriever may be a software module, programmed in VisualBasic code, that calculates "hot gas path" factored hours and starts 24, and other parameters, for each gas turbine. Another example of an application is a software VisualBasic code module that calculates "rotor" factored hour and starts. The results of these calculations from the software applications scheduled by the retriever may be formatted in text files that are output as reports, such as logs, charts and summaries for each gas turbine (see FIG. 13). These reports may be reported to the technicians who operate each gas turbine, then use the reports to schedule maintenance of the gas turbine and pre-order parts for that gas turbine.

By using a standard database platform, such as Microsoft™ Access database, data may be easily stored when retrieved by the "retriever" and then used by software applications to calculate events, modes and other factors of the operation of each gas turbine. The retriever obtains data from the remote database 18 and transfers that data into the access database at server 22. For each gas turbine to be analyzed, the retriever obtains information regarding the operation of the turbine from the remote database 18, and transfers the data into the access database on the server 22. The information regarding that gas turbine is retrieved from the Access database and used by an application program, which also runs on server 22, to calculate, for example, the hot gas factored hours and start for each gas turbine. The results of these calculations are stored in the Access database 22 in connection with the gas turbine for which the calculation was made. The Access database stores operational data and calculation results for each gas turbine. Using this data and results, text reports can be generated that provide logs and summaries to be used by gas turbine technicians to schedule maintenance and order replacement parts.

Based on the data and software applications stored in the server 22, a software system can be implemented that automatically reviews gas turbine operating data obtained from the Oracle™ database 18. The software system calculates the exposure of individual gas turbines to operating conditions and expresses that exposure in terms of factored hours and factored starts (as may be conventionally defined in maintenance manuals). In addition, the Access database and associated application programs may determine the factored hours and factored starts and report them in periodic, such as weekly, reports that identify incremental increases in operating exposures for each gas turbine, and provide total exposures for historical operation of each gas turbine.

The data maintained in the Access database is subject to strict, fixed definitions of the categories for each data. By providing fixed definitions of the data to be inserted in each data field allows the data to be more reliable and useful in predicting maintenance. For example, to determine operational time of a gas turbine, "key events" are defined so as to determine when the gas turbine operation has been started, had the combustion chamber lit and operational, stopped, operated a full speed load and several other criteria.

Figure 2:
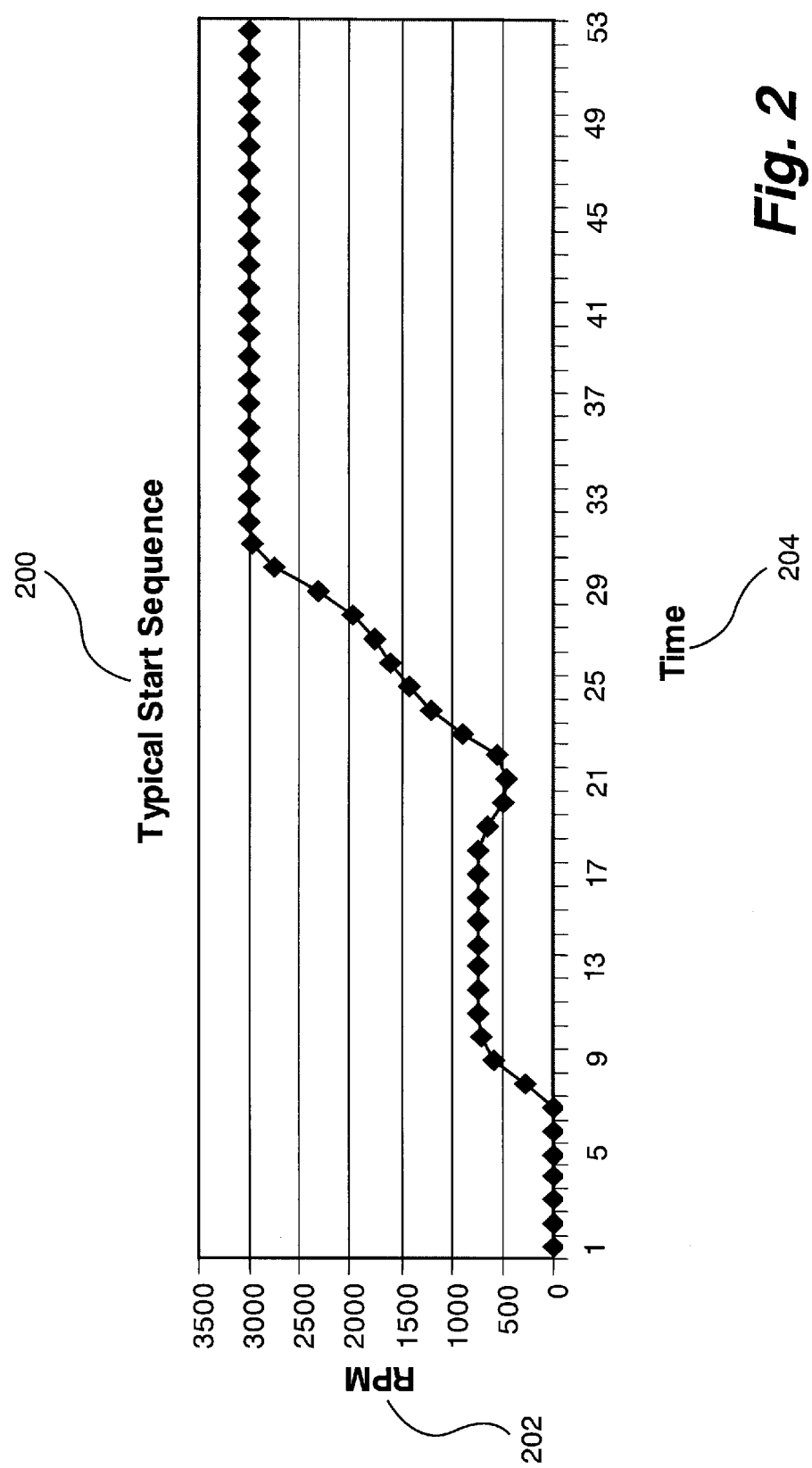
FIG. 2 is a chart showing a typical gas turbine start sequence.

FIG. 2 shows a typical start sequence 200 for a gas turbine where the gas turbine starts from zero revolutions per minute (RPM) 202 at time period 1 along time axis 204 and then is accelerated to full speed by time unit 33 at rpm 3000. The gas turbine is viewed as being started when the fuel stroke reference (FSR) revolutions per minute (RPM) transitions from a zero value to some value greater than zero, such as at time period 8. After the gas turbine has been started, it is "cranked" by an electric motor to a start speed, such as 750 RPM, at which speed fuel is injected into the combustion section and ignited. When the combustion process begins sustaining operation of the gas turbine (see time period 23 in FIG. 2), the gas turbine has been "lit". "Lit" may be defined as a time period after at least 80% of the highest crank speed has been reached and followed by two minutes of increasing RPM, such as a 50 RPM rate of increase per minute.

The gas turbine is viewed to have been "stopped" when the fuel stroke reference (FSR) RPM equals zero, e.g., when the fuel is stopped being injected into the combustion section. The gas turbine is viewed as being at a fuel speed no load (FSNL) when the gas turbine has reached greater than 95% of its rated speed, e.g., within 5% of 3000 rpm, and the output power (DWATT) is less than 5% of the prescribed base load power output for the gas turbine.

Using these data definitions of Start, Lit, Stop and FSNL, consistent operating information can be generated regarding each gas turbine from the sensor data collected from each turbine. These definitions when applied to operational data regarding a gas turbine, enable a computer system to automatically determine turbine operating parameters, e.g., Start, Lit, Stop, FSNL, based on data collected from the sensors monitoring the gas turbine. For example, the timing and number of "fast starts" for each gas turbine may be determined by establishing a criteria defined by a period from "Lit" to "FSNL" which is less than some prescribed time period. Fast turbine starts may create additional wear and tear on the gas turbine, and need to be accounted for in scheduling maintenance. Similarly, the time period from transitioning from full speed no load to full speed full load (FSFL) may be indicative of wear and tear on the gas turbine, especially if this period is relatively short. Thus, by prescribing a parameter for a fast load-turbine criteria by establishing an algorithm in which FSNL to FSFL period is determined as being less than some prescribed fast start criteria may be useful in identifying fast load applications on turbines.

Strict definitions are given to the operational parameters from the gas turbine, so that the data collected from the gas turbine can be automatically used to analyze its operating condition. To create strict definitions for the parameters, typical operating modes and events were selected as modes and events to be defined in manners that can be applied by computer processing systems. The definition of these modes and event reflected the relative severity of each operating modes and each events. The definition of the modes and events involved the creation of new guidelines. The guidelines are used by a computer system, e.g., server 22, to process the gas turbine data and determine when the data indicates that a specific event or mode has occurred. Historically, such definitions of operational parameters had not been precise and unsophisticated field data collection techniques have been common. Moreover, computers cannot automatically determine parameters if the definition of these parameters is vague and subject to interpretation.

The guidelines used for the event and mode definitions generally start with simple approximations of actual duty cycles, such as that a duty cycle may be classified as part-, base-, or peak-load. However, the prior duty cycles did not recognize or give weight to the fact that a gas turbine may be cycled between operating states and mode during a single start-stop cycle. Accordingly, the definitions presented herein of events separate the start of a gas turbine cycle, from the stop of a cycle. By defining the start and stop phases of a gas turbine as separate events, the present technique for evaluating gas turbines allows for non-standard operational cycles to be properly taken into account in scheduling maintenance periods.

Another difficulty with prior, non-precise definitions of gas turbine events and modes is that the guidelines that do exist for defining the events and modes are ambiguous. The application of these guidelines is performed by the technician interpreting the data. Different technicians may have varying interpretations of the same data and, thus, the application of existing guidelines is subjective. To avoid problems with subjective data interpretation, the present definitions of gas turbine events and modes are extremely precise and are established such that they can be readily and automatically determined from sensor data obtained from the gas turbine. These precise definitions work well with digitally recorded and evaluated data obtain from an OSM monitoring of gas turbine. The present definitions of events and modes may be applied to gas turbine data using software applications, and do not require constant human interpretation for coding, as was previously done.

The following is a listing of other event definitions that may be used to establish data regarding important operational events in a gas turbine. Key events "start the clock" in time in the operation of a gas turbine and to assess when an event has occurred.

Start: FSR (Fuel Stroke Reference) transitions from 0 RPM to a value greater than (>) 0 RPM Lit: Start followed by an increase in rotor speed to greater than (>) 80% of a typical start sequence highest crank speed, followed by two minutes of increasing rotor RPM (such as an increase rate greater than 50 RPM each minute)

Stop: FSR transitions from greater than 0 RPM to 0 RPM

FSNL: Full Speed No Load is when the turbine speed is equal to or greater than (≧) 95% rated speed, and the power output (DWATT) is less than (<) 5% of the rated output for the baseload speed.

Lit to FSNL: Period from Lit to FSNL. A "Fast" start may be defined as the "lit to FSNL" period being less than some defined period. This parameter definition may be specific to a turbine model.

FSNL to FSFL period from FSNL to FSFL (full speed, full load): A fast load may be a period from FSNL to FSFL in less than some predetermined period. This parameter definition may be specific to a turbine model.

Time Allocated: [Lit to FSNL]+[FSNL to FSFL]

A listing of events directed to the hot gas path operation of a gas turbine are as follows:

Emergency Start: When the period from Lit to a power output level (DWATT) that is greater than 40% of the base load power output, is less than one-half (<½) the time allocated for a normal start.

Fast Load Start: Not an emergency start, and the period of "Lit to (DWATT>40% base load) is greater than one-half (>½) of the time allocated and Lit to DWATT>50% base load of the time allocated.

Peak Load Start: Lit to peak load within 1 hour, and not a Fast Load or Emergency Start.

Base Load Start: Lit to Base Load (but not peak load) within one hour, and not a Fast Load or Emergency Start.

Part Load Start: Lit to FSNL (but not base load) within one hour, and the start is not a Fast Load or Emergency Start.

Peak Load Stop: Peak Load to Stop in more than five minutes (>5 min.), but less than sixty minutes (<60 min.).

Base Load Stop: Base Load to Stop in more than five min., but less than sixty min., and not a Peak Load Stop.

Part Load Stop: Decelerating from Part load or FSNL to stop in more than five min. and less than sixty min., and the stop is not a Peak Load or Base Load Stop.

Stop Trip: Transition from FSNL (or any load) to stop in less than five min., or Lit to less than FSNL, followed by stop, in less than five min.

Defined events and modes that relate to the rotor (the mechanical shaft(s) of the gas turbine that includes the compressor and turbine) may include the following:

Hot Restart—Fast load: In less than one hour after the last full speed, going from Lit to more than 50% of base load (in time normally allocated for the Lit to 50% of base load).

Hot Restart—Normal Load: In less than one hour after last full speed, going from Lit to less than 50% base load (in time normally allocated) or Lit to FSNL in less than twice the normal period for Lit to FSNL.

Hot—Fast Load: In one to four hours after last full speed, going from Lit to more than 50% base load power output (in time normally allocated).

Hot—Normal Load: In one to four hours after last full speed, going from Lit to less than 50% of base load power output (in time normally allocated) or from Lit to FSNL in less than twice the normal period for Lit to FSNL.

Warm1—Fast Load: In four to twenty hours after last full speed, going from Lit to 50% (or more) base load (in time normally allocated).

Warm1—Normal Load: In four to twenty hours after last full speed, going from Lit to less than 50% base load (in time normally allocated) or Lit to FSNL in less than twice the period allotted for Lit to FSNL.

Warm2—Fast Load: In twenty to forty hours after last full speed, going from Lit to 50% (or more) base load (in time normally allocated).

Cold—Fast Load: Forty hours or more after last full speed, going from Lit to 50% (or more) base load (in time normally allocated).

Cold—Normal Load: Forty hours or more after last full speed, going from Lit to less than 50% base load (in time normally allocated) or Lit to FSNL in less than twice the time allotted for Lit to FSNL.

Stop Trip—Any Load: Full speed (FS) to Stop in less than five min.

Some of these events may have in the past been conventionally determined using manual logs and human judgment and conventional maintenance scheduling techniques. By providing the above precise definitions of start, stop and other gas turbine operational events, the present system enables digital data collected from sensors to be categorized and to identify the occurrence of these specific events. Because these event definitions have been defined precisely, they may be uniformly applied to various gas turbines and through various time periods to provide uniform and reliable data regarding the operation of the gas turbine. These precise event definitions avoid the need of having human technicians review the data and enter their personal judgments as to when these events occurred.

Figure 3:
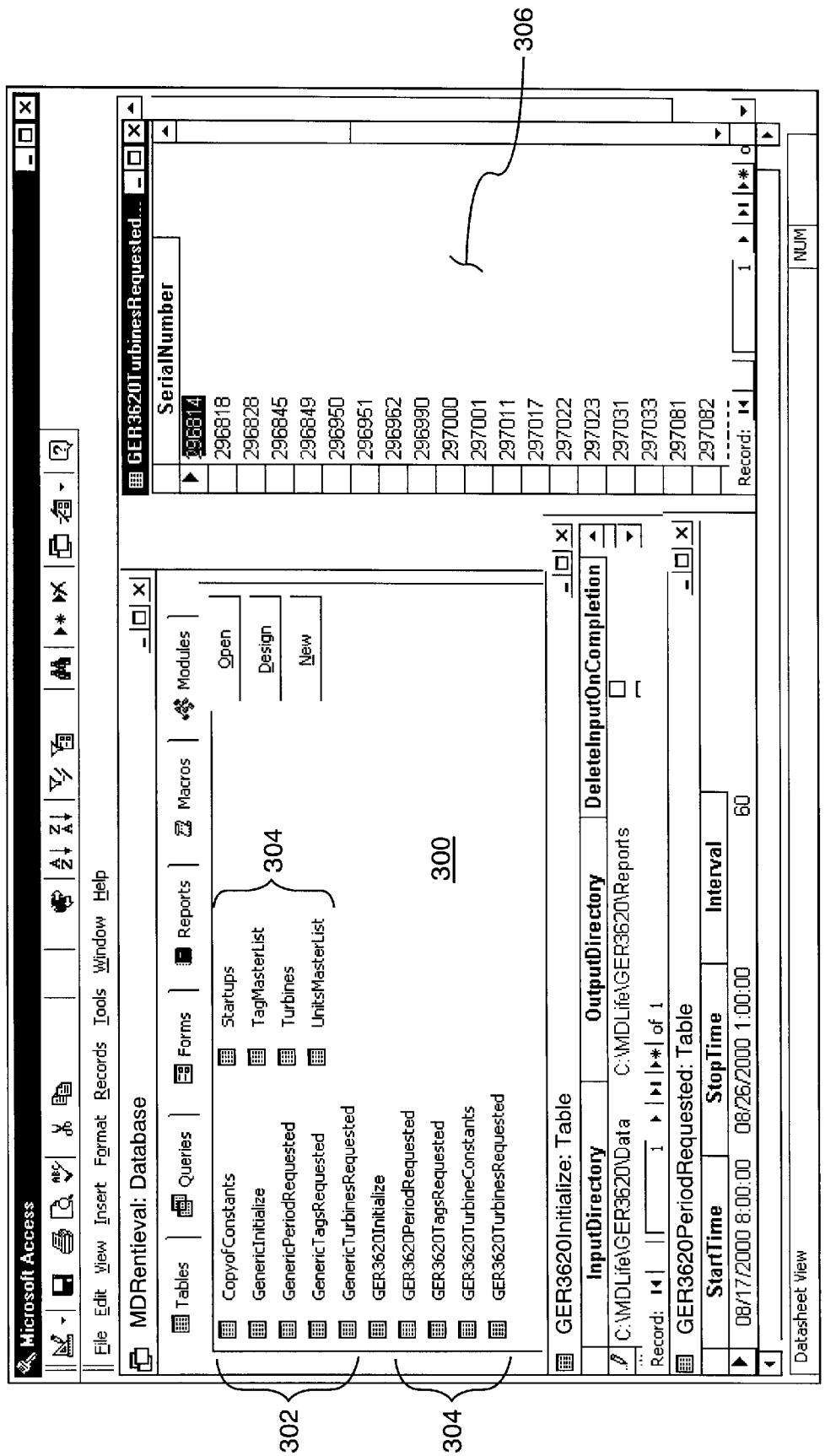
FIG. 3 is a computer screen window image showing an exemplary window for capturing data regarding multiple operational gas turbines.

FIG. 3 shows an exemplary display screen window image presented on a user display coupled to the VisualBasic/Access server 22. This display provides user access to the data collected by the "retriever" from other remote databases having gas turbine information. The window 300 provides a Microsoft™ Access database interface that allows the user to see the various types of data that can be collected from the Oracle™ database 18 and also the applications on the server 22 which can be initiated by the retriever. For example, generic data requests are listed at 302. These requests may be called up and edited by a user for specific data retrieval needs, or may be automatically and periodically run to capture certain uniform data. The listing of other data requests at 304 also indicate other details that may be available on the database or server 22. In addition, the window 300 shows a listing of various gas turbines for which each of the data retrieval requests and software applications may be initiated at 306.

FIG. 4 shows a screen window 400 that provides a user interface to the data stored in the Microsoft Access database on server 22. This data is listed both by the individual gas turbines in a listing 402 and by various groups of data, indicated by tag data formats. Each data tag 404 represents a different type of data collected from the gas turbines.

Figure 5:
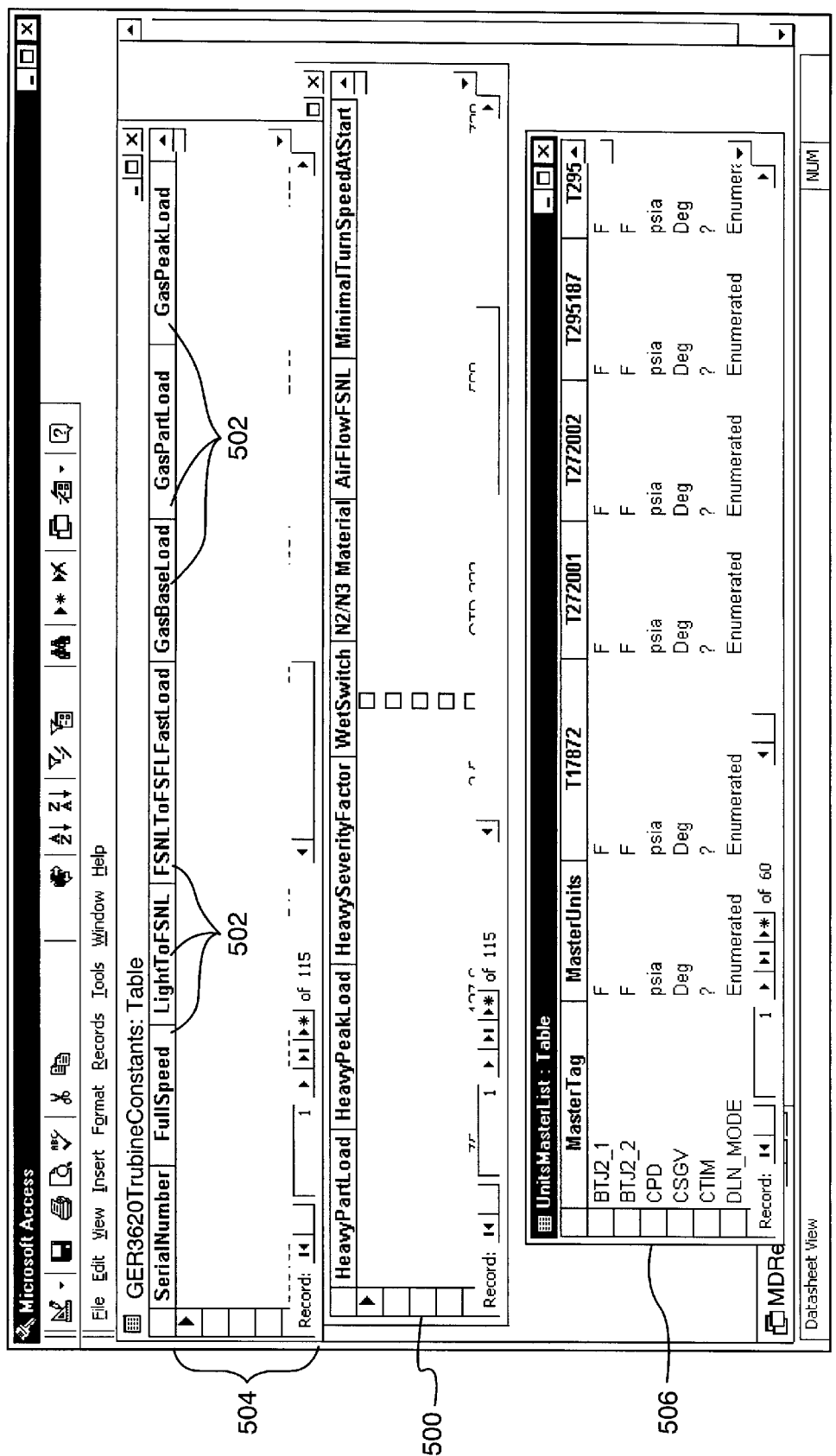
FIG. 5 shows constant parameter values related to multiple gas turbines.

FIG. 5 shows a user interface screen having access to the database on server 22. This screen 500 shows various turbine constants that are maintained for each turbine. These constants are generally unique to each gas turbine model. The constants are also proprietary, do not form part of the invention described herein (as such constants are conventional), and actual constant values are not shown here. For example, the constant defining full speed, time period for a fast light to full speed—no load and other constants are presented in this listing of turbine constants 502. These constants are used with the variable data stored in the Access database to calculate various events in the operational life of each gas turbine, and as described above. These constants may be specific to turbines and, thus, are listed for each gas turbine 504. In addition, a table 506 is shown that indicates the units associated with data fields.

Figure 6:
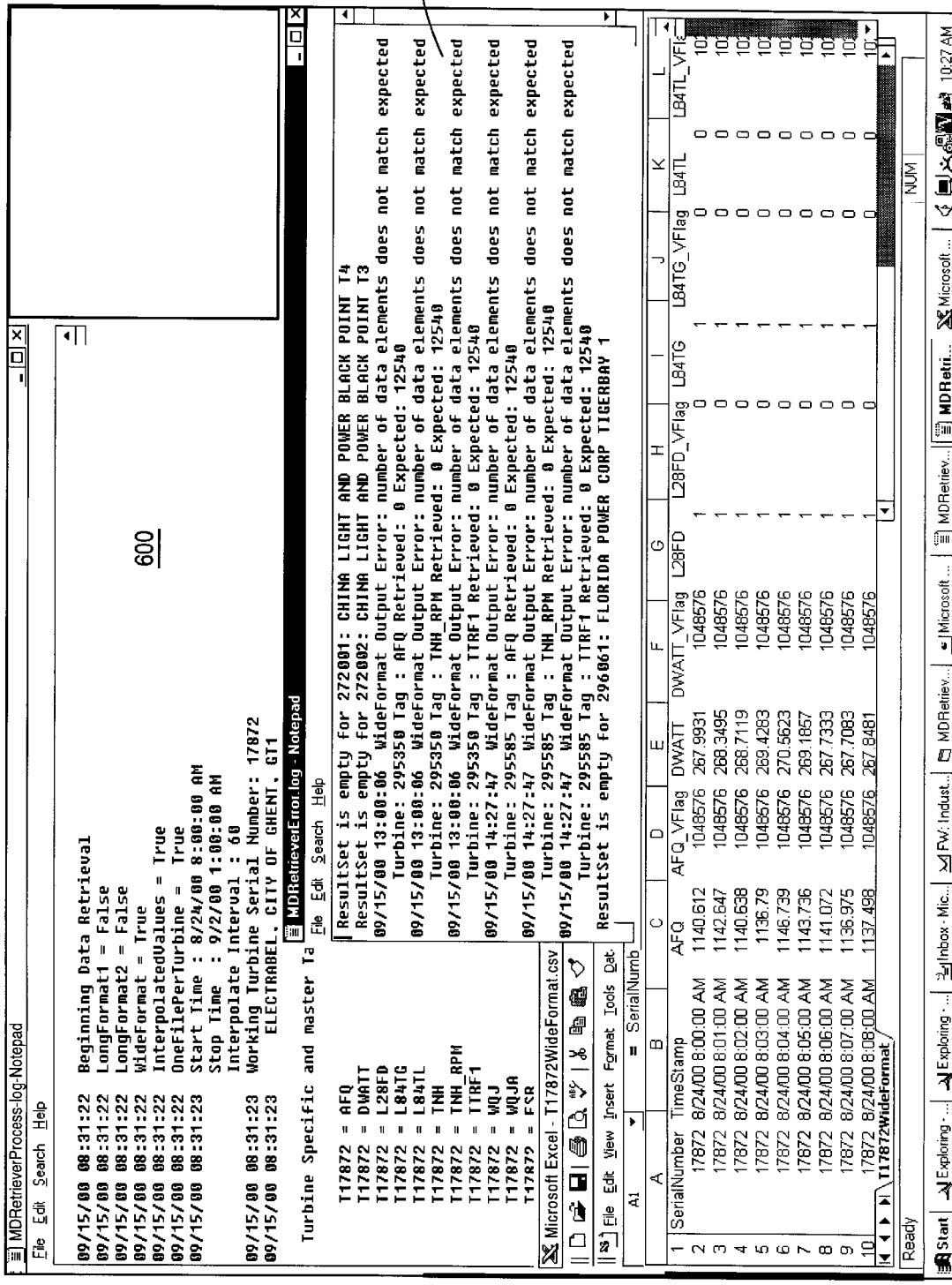
FIG. 6 shows a computer screen window image of a listing of data errors that have been encountered in transferring data to be used for analysis.

FIG. 6 shows a user window screen generated by the server 22 that lists the process of retrieving data from remote databases in window 600. This listing provides a crosscheck for a database software technician to ensure that the data retrieval process has been properly accomplished. In addition, errors in the transfer of data that are noted by the retriever software process are reported in the window 602. By viewing this window of errors, the software technician can make corrections to the Access database on server 22 to ensure that the data stored therein is accurate.

FIG. 7 shows the process steps used to retrieve data from the Oracle™ database 18, process that data and generate reports. The steps include reading data using the retriever to generate a wide format data file format. The retriever derives data from the Oracle™ database in formats as that data is stored on the Oracle™ database. That derived data may be in formats that are incompatible with the processing of the data to be done on the Access database. The validity of the data may be also verified by performing certain validity checks such as is power for a gas turbine reported as being out when the gas turbine is operating at less than 95% of its full load speed. In addition, the retriever insures that data being requested is actually available form the Oracle™ database. If the requested data is not available, then an error is reported on the error log shown in FIG. 6. Similarly, errors are reported on the log if the data is not viewed as being valid. Once the data has been retrieved and determined to be valid, it is stored in the Access database on server 22.

The data held in the Access database 22 may be used to generate calculations regarding the operation of each gas turbine, and particularly, the operational status of its rotor and hot gas path. For example, the hours of operation for the rotor and hot gas path, and the number of starts encountered for the rotor and hot gas path in each gas turbine are calculated and stored in the Access database. Other software calculations are performed on the database to generate various types of information indicative of the operational health of a gas turbine. Based on the information stored in the Access database, outputs are generated such as printed reports, that are used by technicians to determine maintenance schedules and to order parts for the gas turbines.

Figure 8:
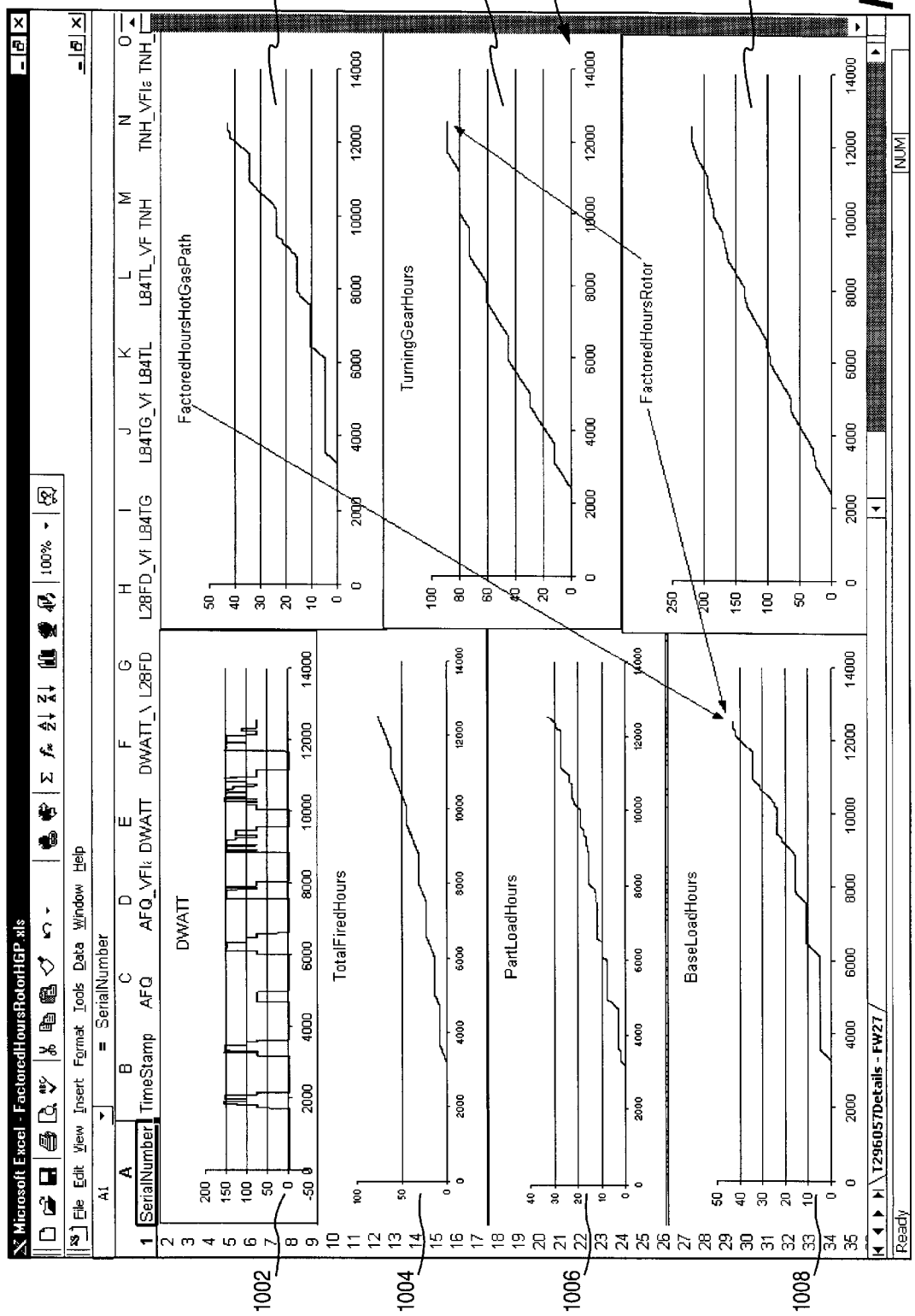

FIG. 8 is a display screen window 1000 that graphically shows data that has been calculated and stored in the access database. For example, the output power wattage (DWATT) is graphically shown as a function of hours at graph 1002. Other graphs show the total fired hours, e.g., the period during which the combustion section is sustaining operation of the gas turbine, as a function of hours in graph 1004; the part load hours of a gas turbine, which represent the hours during which the gas turbine is operating at less than full load in graph 1006; and the number of base load hours of a gas turbine at which the gas turbine is operating at full load in graph 1008.

The factored hours of the hot gas path, which represents the severity of the operating time during which combustion gases are being generated in the combustion section of the gas turbine are graphically shown in chart 1010. Another operating factor for a gas turbine is the time during which the machine is not being operated by the rotor is turned to maintain uniform temperature, graphically shown in chart 1012. A further chart 1014 may show the factored hours for the rotor which represents the period during which the rotor is both being driven by the hot gas path and being turned.

Figure 9:
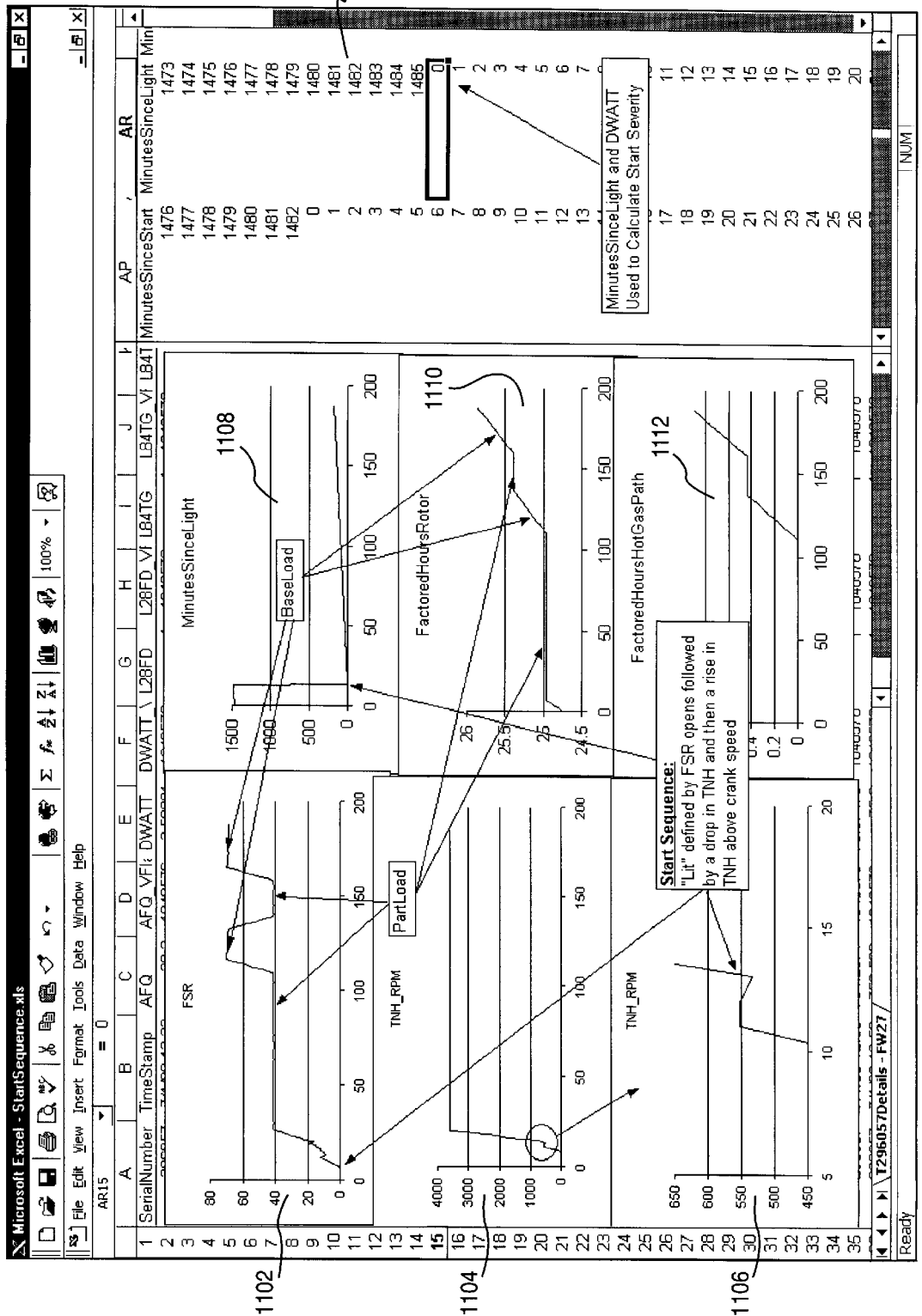

FIG. 9 shows additional charts and lists which can be generated from the data on each operating turbine as stored in the Access database. For example, data can be graphically presented as shown in FIG. 9 that shows the fuel stroke reference (FSR) value 1102 per time in hours, which represents the fuel flow to the combustion section. Other graphs show the rotational speed of the gas turbine, 1104, and the rotational speed of the gas turbine during the start sequence in 1106. The rotational speed during the start sequence is used to detect when the gas turbine has been "lit" and graph 1106 clearly shows at approximately time unit 13 a short drop in rotational speed followed by a rapid rise in rotational speed as the combustion section begins driving the gas turbine and takes over from the starting motor.

Other graphs may show time period since the last time the gas turbine was last "lit" (1108); the factored hours of the rotor 1110, and the factored hours for the hot gas path 1112. In addition, the data shown on the graphs may be represented in other forms, such as a listing of data as shown at 1114.

Figure 10:
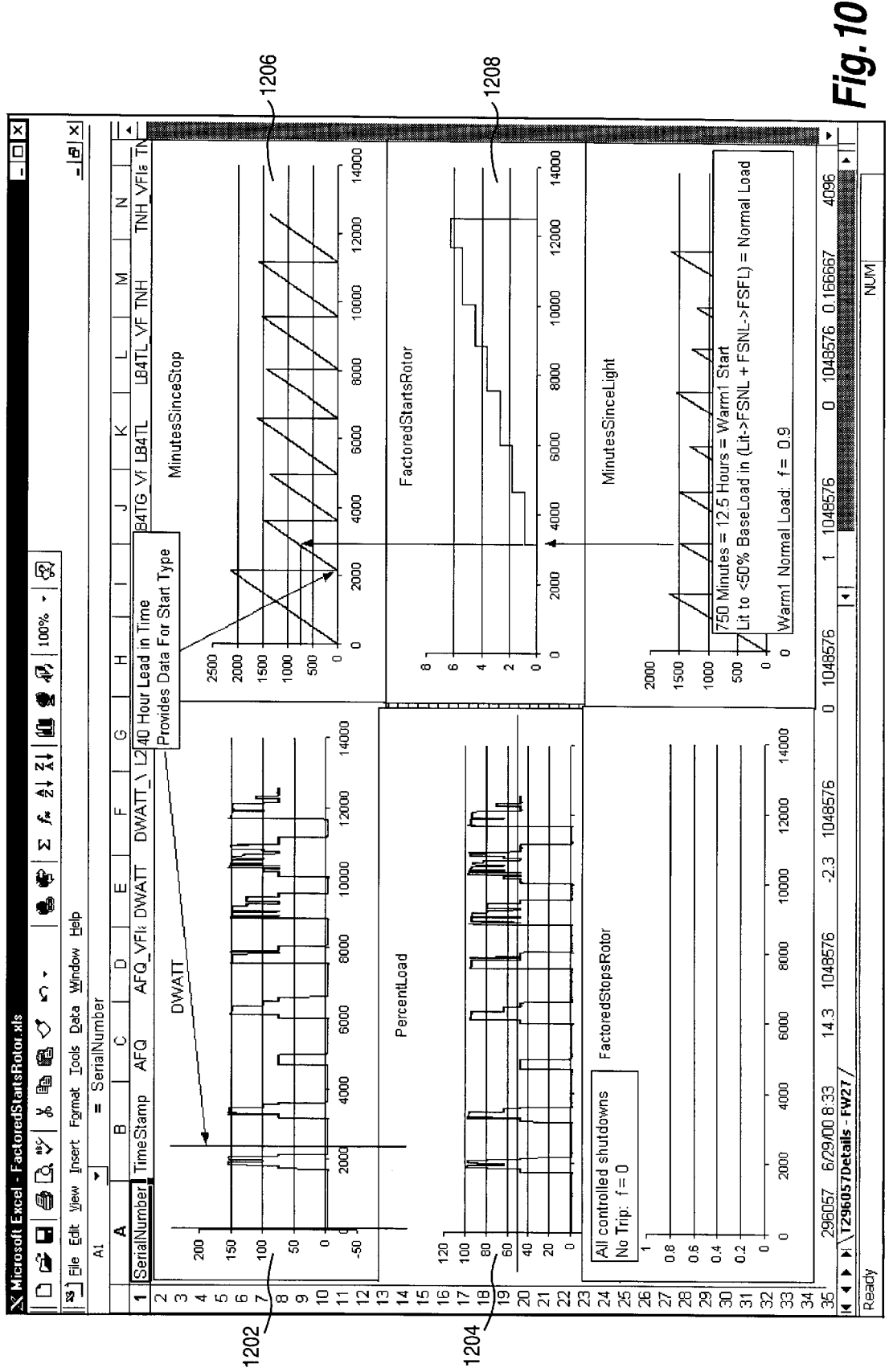
Figure 12:
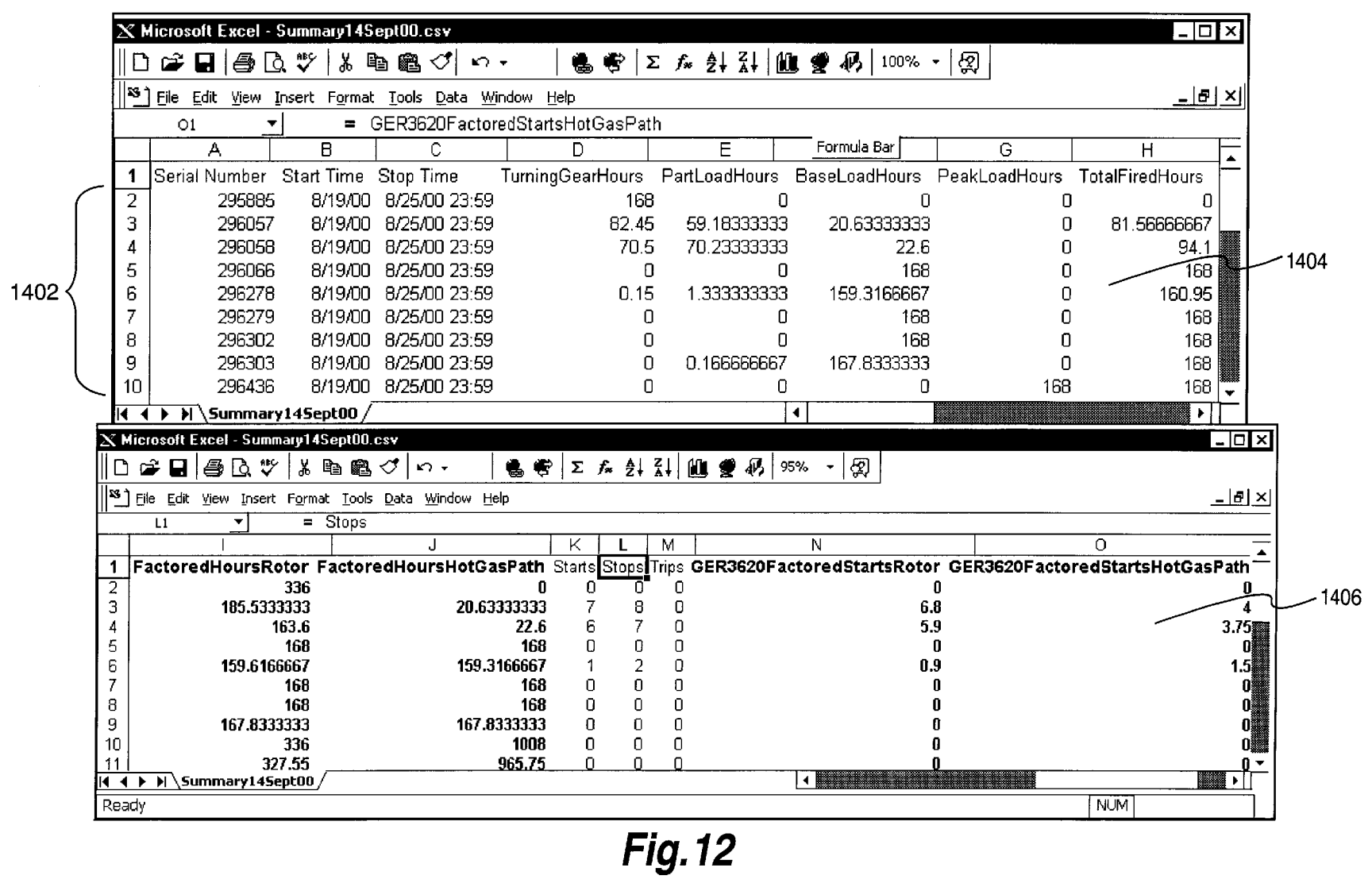

FIG. 10 shows another group of charts that present operational data of a gas turbine. The group of charts shown in FIG. 12 show the power output (DWATT) as function of a time in graph 1202 which can be visually compared to the operating load percentage (percent load) shown in graph 1204. In addition, the charts showing the minutes elapsed since each rotor stop, 1206, which shows a saw-tooth pattern which drops to zero at the stop of each gas turbine and rises linearly until the gas turbine is stopped again, 1206. This graph can be compared to the subsequent chart showing the factored starts for the rotor and the gas turbine as shown in graph 1208.

Figure 11:
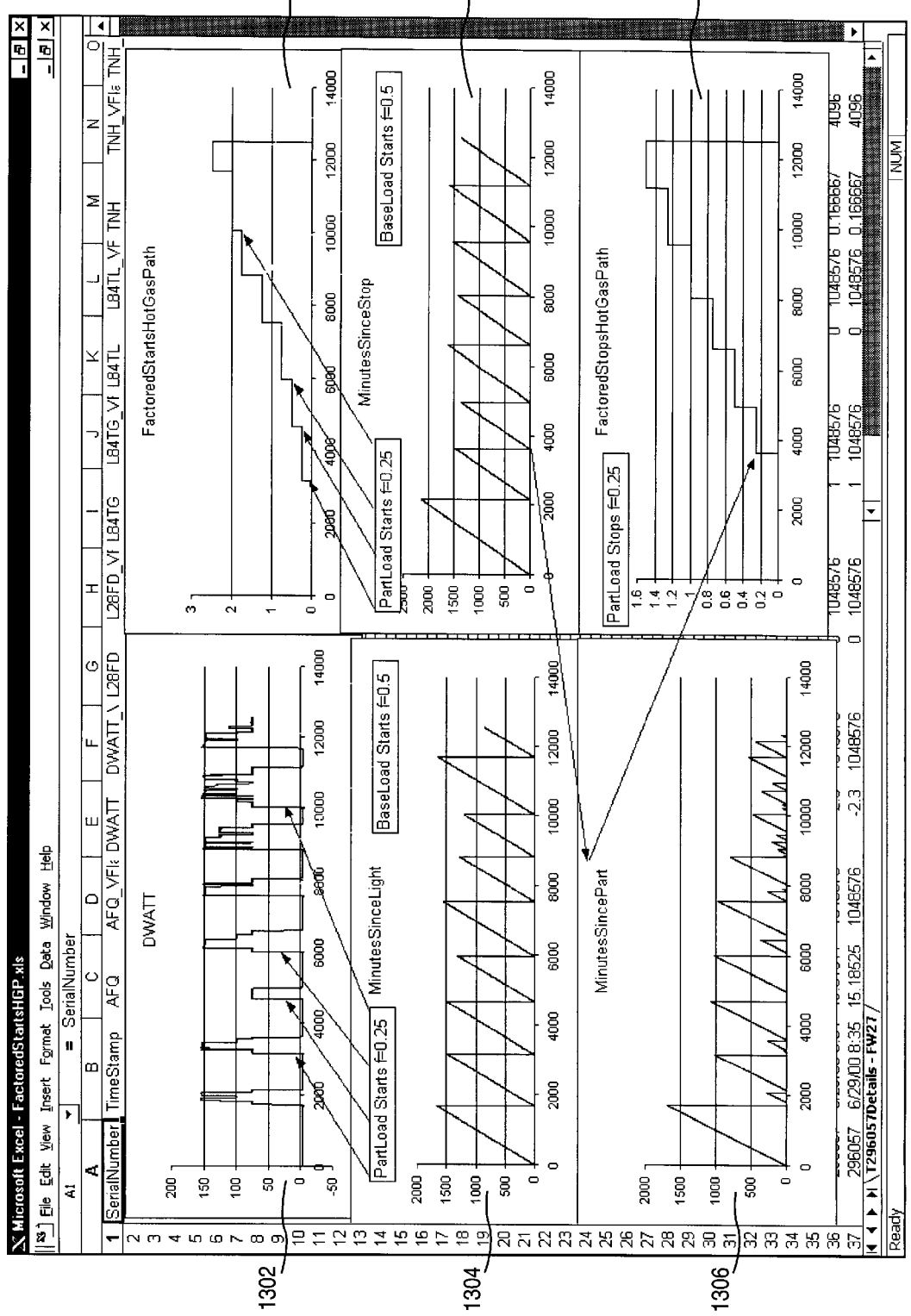

FIG. 11 shows as a series of charts that reflect the factored starts for the hot gas path. In particular, chart 1302 shows the power output (DWATT) as a function of time. By viewing this chart 1302, the full load and part load operating phases of the gas turbine can be determined and compared to other factors of the operation of the gas turbine, such as number of minutes since last turbine lit 1304 and number of minutes since last turbine part-power operation 1306. Other charts which reflect the factored starts of the hot gas path in 1308, the minutes since the last stop of the gas turbine in 1310 and factored stops of the hot gas path in 1312.

FIG. 12 shows an exemplary summary report for various gas turbines (represented by serial numbers in column 1402). For each gas turbine, there is a listing of start time, stop time, turning gear hours, part load hours, etc. This listing 1404 provides summary presentation of the operating conditions of the listed gas turbines. The criteria listed for each gas turbine may be continued to another window 1406, where the row in the chart 1406 corresponds to the rows in the chart 1404 and both charts 1404, 1406 are split views of the same listing.

The charts shown here are examples of reports and presentations that may be made of the data in the database held on the Access database server 22. This information may be presented, manipulated or processed in other ways dependent on how the gas turbine technicians desire to view the data. For example, parameters used to calculate the factored hours of operating the gas turbine and the gas turbine starts, may be summed and/or recorded so as to show the operational history of the gas turbine and its overall operation (sum) of starts and hours. In addition, part-specific maintenance factors, which have been previously developed, may be implemented using the data available on the server 22 to generate reports that identify specific parameters related to parts, such as a compressor shaft and scheduled maintenance of that part.

The data may be spread out over various databases and not all consolidated on a single database server 22. For example, if real time data is needed or desirable for processing, the server 22 may directly capture data taken off the OSM 16 on site with the gas turbine and not wait for the data to be sequentially transferred from the OSM, to the Oracle™ remote database 18 and then to the Access database 22.

The system disclosed herein collects operational data of a gas turbine, processes that data and stores processing results in an Access database server 22 for generation of reports used to schedule maintenance and order parts. The system provides an effective and automatic tool to organize maintenance of gas turbines. The system may be adapted to work with existing gas turbine database collection systems, such as represented in FIG. 1 by the OSM 16 and Oracle™ database 18, and capture existing data in another database application on Access server 22. The system avoids having to create redundant systems to collect data directly from gas turbines.

The system applies defined rules to the data that has been collected so as to calculate the rotor factored hours and hot gas path factored hours, automatically and without need for human interpretation of that data. Similarly, the starts and stops of the gas turbine may be automatically determined without having to rely on human interpretation of data. Data regarding the operation of a gas turbine is automatically processed and reports are generated that allow technicians to schedule maintenance and order parts for replacement of the gas turbine. The maintenance technicians are relieved of much of the burden of having to analyze data and manually develop their own reports to schedule maintenance. Thus, the technicians have additional time to devote to actual maintenance of gas turbines, where their talents are best served.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for tracking usage of a gas turbine comprising the steps:
   a. sensing, capturing and storing data indicative of operating conditions and corresponding operating times of the gas turbine;
   b. establishing criteria to define a plurality of gas turbine operational events;
   c. applying the criteria to the stored data to automatically determine the timing of the plurality of gas turbine operational events;
   d. generating output data indicative of the timing of each of said plurality of device operational events, and
   e. graphically showing the output data to a tracking information of machine usage.

2. A method as in claim 1 wherein the criteria established include gas turbine start criteria defined by a fuel stroke reference speed of the gas turbine accelerating from zero to a greater speed.

3. A method as in claim 2 wherein the criteria established include a gas turbine Lit criteria defined by a start event as defined by the start criteria followed by a rotor speed increase to a predetermined crank speed and followed by a further increase in rotor speed.

4. A method as in claim 3 wherein the criteria established includes a fast start criteria which is accelerating the gas turbine from Lit to Full Speed No Load (FSNL) in less than a predefined period.

5. A method as in claim 4 wherein the criteria established includes a Fast Load criteria which is accelerating a gas turbine from FSNL to Full Speed Full Load (FSFL) in less than a predefined period.

6. A method as in claim 1 wherein said criteria include criteria related to usage of a hot-gas path in the gas turbine.

7. A method as in claim 1 wherein said criteria include criteria related to a usage of a rotor of the gas turbine.

8. A method for tracking usage of a gas turbine comprising the steps:
   a. sensing and capturing operational data indicative of operating conditions at a series of operating times of the gas turbine, and storing the data locally to the gas turbine;
   b. periodically transferring the operational data to a remote data storage location;
   c. retrieving selected operational data from the remote data storage location;
   d. determining a plurality of gas turbine operational events for at least one of the plurality of gas turbines, wherein said operational events are determined by applying criteria which define the events with respect to the retrieved selected operational data, and
   e. generating an output reporting the operational events for said at least one of the plurality of gas turbines.

9. A method as in claim 8 wherein the retrieved selected operational data and data representative of the operational events are stored in a database server separate from the remote data storage location.

10. A method as in claim 8 wherein the criteria includes a Start criteria defined as an event when a Fuel Stroke Reference (FSR) of the gas turbine transitions from 0 RPM to a value greater than (>) 0 RPM.

11. A method as in claim 10 wherein the criteria includes a Lit criteria defined as an event, following a Start, and occurring in the gas turbine when a rotor speed increases to greater than 80% of a typical start sequence highest crank speed and followed by two minutes of increasing rotor RPM.

12. A method as in claim 8 wherein the criteria includes a Stop criteria defined by when a FSR transitions from greater than 0 RPM to 0 RPM.

13. A method as in claim 8 wherein the criteria includes a Full Speed No Load (FSNL) criteria is defined as an event occurring when the gas turbine operates at a speed equal to or greater than 95% of a rated speed for the gas turbine and an output power from the gas turbine is less than 5% of an output baseload power output.

14. A method as in claim 8 wherein the criteria includes a Fast Start criteria defined as when the gas turbine accelerates from Lit to FSNL in a period less than a predefined time period for the gas turbine.

15. A method as in claim 11 wherein the criteria includes an Emergency Start criteria which is defined as a period in which the gas turbine accelerates from Lit to a power output (DWATT) greater than 40% of a base load for the gas turbine, where said period is less than one-half the time prescribed for a normal start of the gas turbine.

16. A method as in claim 15 wherein the criteria includes criteria for the operation of the gas turbine including Load Start, Peak Load Start, Base Load Start, Part Load Start, Peak Load Start, Base Load Start, Part Load Stop and Stop Trip.

17. A method as in claim 8 wherein the criteria includes a Hot Restart—Fast Load criteria defined as when the gas turbine accelerates from a Lit condition to more than 50% of base load a in time period normally allocated for such an acceleration, and the acceleration occurs less than one hour after the last full speed operation of the gas turbine.

18. A method as in claim 17 wherein the criteria further includes criteria for Hot Restart—Normal Load, Hot—Fast Load, Hot—Normal Load, Warm to Fast Load, Warm to Normal Load and Warm to Fast Load operation of the gas turbine.

19. A method as in claim 8 wherein the criteria includes a Cold to Fast Load criteria defined as when forty hours or more have elapsed after a last full speed gas turbine operation, before the turbine is accelerated from a Lit condition to a condition of fifty percent (50%) or more of a base load for the gas turbine, where the acceleration is performed in a period normally allotted for such an acceleration.

20. A method as in claim 19 wherein the criteria further includes criteria for a Cold to Normal Load transition, and a Stop Trip to Any Load transition of the gas turbine.

21. A system for collecting and analyzing operational events in a gas turbine comprising:

a network of sensors monitoring a plurality of operational conditions of the gas turbine;

an on-site computer system collecting data from said sensors and storing the data locally to the gas turbine;

a first remote computer system periodically downloading data from the on-site computer system and storing the data with other data collected from other on-site computer systems also collecting sensor data from gas turbines, and a second remote computer system retrieving selected data from the first remote computer system regarding a plurality of gas turbines, said second remote computer system storing gas turbine operational event criteria, and applying the criteria to determine a plurality of operational events which occurred in each of said plurality of gas turbines.

* * * * *

UNITED STATES PATENT AND TRADEMARK OFFICE
CERTIFICATE OF CORRECTION

PATENT NO. : 6,343,251 B1  
DATED : January 29, 2002  
INVENTOR(S) : Herron et al.

It is certified that error appears in the above-identified patent and that said Letters Patent is hereby corrected as shown below:

Column 2,  
Line 39, "for the turbine" should read -- for which the turbine --.  
Line 41, "gas turbine," should read -- gas turbine; actual --.

Column 7,  
Line 32, "started, had the combustion" should read -- started, and has the combustion --.  
Line 61, insert a comma (,) after "definitions".

Column 8,  
Line 56, "obtain" should read -- obtained --.

Column 12,  
Line 20, delete "last".  
Lines 62-63, "dependent" should read -- depending --.  
Line 65, after "starts" delete the comma (,).

Column 14,  
Line 53, "criteria is defined" should read -- criteria defined --.

Column 15,  
Line 9, "load a in time" should read -- load in a time --.

Signed and Sealed this

Thirteenth Day of August, 2002

Attest:

*Attesting Officer*

JAMES E. ROGAN  
*Director of the United States Patent and Trademark Office*